A. P. WALLACE.
MACHINE FOR CUTTING BUTTON BLANKS FROM SHELLS.
APPLICATION FILED FEB. 8, 1907.
904,103.
Patented Nov. 17, 1908.
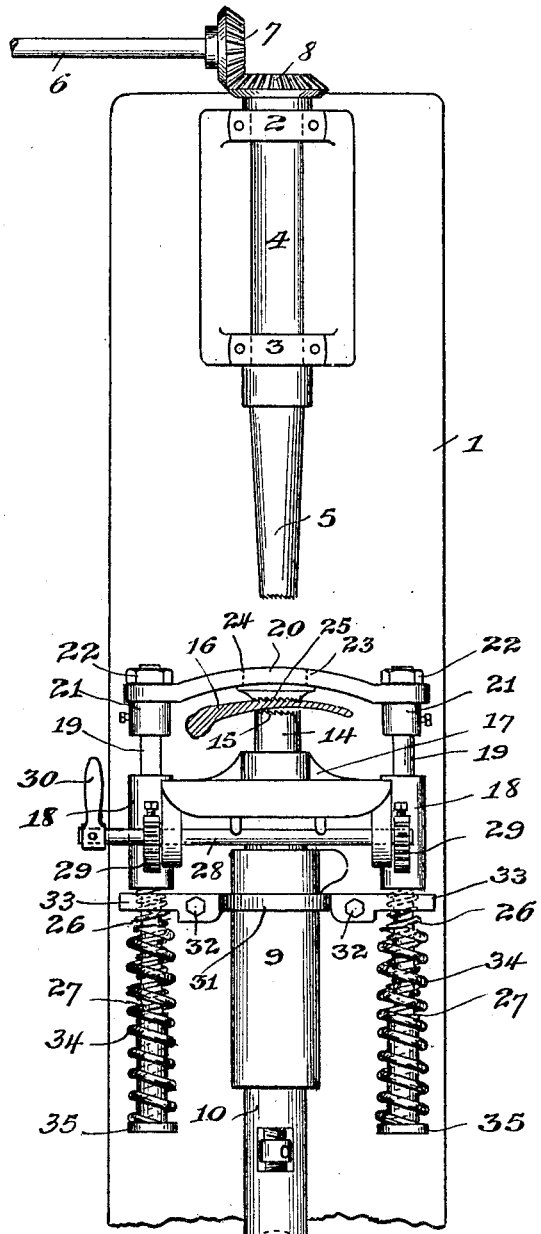
Witnesses,
Inventor,
Archie P. Wallace,
By Offield, Towle
& Linthicum
Attys.

UNITED STATES PATENT OFFICE.

ARCHIE P. WALLACE, OF KEITHSBURG, ILLINOIS.

MACHINE FOR CUTTING BUTTON-BLANKS FROM SHELLS.

No. 904,103.    Specification of Letters Patent.    Patented Nov. 17, 1908.

Application filed February 8, 1907. Serial No. 356,450.

*To all whom it may concern:*

Be it known that I, ARCHIE P. WALLACE, a citizen of the United States, residing at Keithsburg, in the county of Mercer and State of Illinois, have invented certain new and useful Improvements in Machines for Cutting Button-Blanks from Shells, of which the following is a specification.

This invention relates to machines for making button blanks, and more particularly to that class or type thereof which are used in cutting button blanks from one of the plates or valves of a bivalvular shell, such as the shell of a fresh water mussel, from which the present so-called pearl buttons of commerce are extensively made. Machines of this class commonly employ a rotary annular saw to effect the cutting of the blank from the shell, a contact-plug or abutment member on or against which the shell is secured in proper position to be cut, a clamp for holding the shell on or against such contact-plug, and means for producing a relative to and fro movement between the cutter and the contact-plug. To secure the best results, it is desirable to hold the shell as rigidly as possible against the plug by means of the clamp during the cutting operation; while it is also desirable to apply the clamp lightly when the parts are in non-cutting position to facilitate the work of the operator in applying and removing the shell.

The object of the present invention, therefore, may be said to be to provide a new and improved means for effecting an increased gripping and holding effect of the clamp upon the shell during the cutting operation; which object I carry out by a mechanism involving the employment of springs so disposed as to be called into action during the feeding movement of the shell toward the saw and operating to apply an increased pull upon the clamp so as to draw the latter upon the shell with increased force just prior to and during the cutting engagement of the saw with the shell.

My invention, and its manner of operation, will be readily understood when considered in connection with the accompanying drawing, which shows in elevation so much of the parts of a button blank cutting machine as is essential to make clear the nature, construction, and manner of working of the mechanism embodying the invention.

Referring, therefore, to the said drawing for a more detailed description of the mechanism, and first describing such parts of the machine as are now in use, 1 may designate a fixed supporting frame or standard, which may be of any desired form or construction, that is provided near its upper end with a pair of bearings 2 and 3 for arbor 4 of an annular saw indicated at 5. Rotary movement is imparted to the saw from a driven shaft 6 through bevel pinions 7 and 8 fast with the shaft 6 and arbor 4, respectively, and intermeshing with each other.

To the frame 1 beneath the saw 5 is rigidly secured a bearing sleeve 9, in which is slidably mounted a post 10 carrying at its lower end a roller 11 that may rest on the periphery of a suitable operating cam or eccentric 12 fast on a driven shaft 13. The post 10 carries at its upper end a contact-plug 14 preferably provided with an annular row of teeth or serrations on its upper edge indicated at 15, said contact-plug serving as an abutment for the shell to be cut, which is shown in cross-section at 16. The post 10 also has mounted thereon just below the contact-plug 14 a yoke 17, the laterally projecting arms of which terminate in vertical sleeve bearings 18 designed to accommodate a pair of slidable tension rods 19. The rods 19 carry at their upper ends a clamp adapted to engage the shell 16, which clamp may conveniently consist of a slightly bowed plate 20 secured at its ends on the rods 19 between fixed collars 21 and nuts 22. The clamp plate 20 is centrally apertured, as indicated at 23; and to the under side of the plate and surrounding said aperture is secured, or formed integrally, a depending annular lip 24 having a serrated lower edge 25 adapted to bite upon the back of the shell and force the same securely upon the upper edge of the contact-plug 14. A light tension of the clamp upon the shell, such as permits the clamp to be raised by the operator sufficiently to insert an extra shell without difficulty, is maintained by means of comparatively light compression springs 26 inserted between annular shoulders 27 on the rods 19 and the lower ends of the bearing sleeves 18. To raise the clamp plate when desired, a simple manually operable mechanism is shown consisting of a shaft 28 journaled transversely of the yoke 17 and carrying segment gears 29 that coöperate through vertical slots in the sleeves 18 with gear-racks formed on the rods 19; a suitable handle 30 being applied to the shaft 28 for operating the same.

Referring now to the subject-matter of my present improvements, 31 designates as an entirety an abutment member rigidly secured to the bearing sleeve 9 as by an ordinary split collar united by bolts 32, said abutment member having laterally projecting portions 33 that are apertured for the free passage therethrough of the rods 19 and coil springs 26; and 34 designates each of a pair of stiff coil springs that encircle the rods 19 and lighter coil springs 26 resting at their lower ends on the heads or nuts 35 forming shoulders on the lower ends of said rods 19. The springs 34 are of such length that, when the clamp 20 is engaged with a shell, as shown, said springs are inactive, their upper ends being some distance below the abutments 33.

The post 10, yoke 17, and rods 19 unitedly constitute in effect a carriage for the contact-plug 14 and clamp 20; and in the operation of the mechanism, as the cam 12 raises the carriage and parts carried thereby toward the saw, before the shell is brought into contact with the saw the upper ends of the springs 34 engage the abutments 33, and the continued upward movement of the parts places said springs under gradually increasing compression, which effects a correspondingly gradually increasing downward pull on the clamp 20 which, by the time the saw engages the shell, is sufficiently strong to hold the shell between the clamp and contact-plug against displacement under the action of the saw, and thereby insures a true and accurate cutting of the blank.

I claim:

1. In a machine for cutting button blanks from shells, the combination with a rotary annular saw, of a carriage, a contact-plug carried thereby, a clamp-plate also carried by said carriage adapted to coöperate with said contact-plug to hold a shell, spring means constantly urging said clamp-plate toward said contact-plug, means for feeding said carriage toward said saw, and other spring means brought into action during such feeding movement of said carriage operating to additionally draw said clamp toward said contact-plug under a gradually increasing pull as said carriage approaches said saw, substantially as described.

2. In a machine for cutting button-blanks from shells, the combination with a rotary annular saw, of a carriage, a contact-plug carried thereby, a clamp also carried by said carriage and coöperating with said contact-plug to hold a shell, means for feeding said carriage toward said saw, springs also carried by said carriage and connected at one end to said clamp, and fixed abutments adapted to be engaged by the other end of said springs during the movement of said carriage toward said saw, substantially as described.

3. In a machine for cutting button-blanks from shells, the combination with a rotary annular saw, of a post mounted to reciprocate endwise, a contact-plug carried on the upper end of said post, a yoke also carried by said post the arms of which terminate in bearing-sleeves, rods slidably mounted in said bearing-sleeves and provided with upper and lower shoulders, a clamp-plate mounted on and between the upper ends of said rods and coöperating with said contact-plug to hold a shell, relatively light coil springs embracing said rods and confined endwise between said upper shoulders and the lower ends of said bearing-sleeves, means for raising said post and the parts carried thereby to said saw, fixed abutments through which said rods extend, and relatively heavy coil springs embracing said rods, said last-named springs being stepped at their lower ends on said lower shoulders and at their upper ends adapted to contact said abutments during the rising movement of said post, substantially as described.

ARCHIE P. WALLACE.

Witnesses:
R. E. BLOOMER,
E. E. DETERLINE.